(12) United States Patent
Inagaki et al.

(10) Patent No.: US 7,644,576 B2
(45) Date of Patent: Jan. 12, 2010

(54) SENSOR CONTROL DEVICE

(75) Inventors: Hiroshi Inagaki, Kounan (JP); Ronald S. Patrick, Los Altos, CA (US)

(73) Assignee: NGK Spark Plug Co., Ltd., Nagoya (JP)

( * ) Notice: Subject to any disclaimer, the term of this patent is extended or adjusted under 35 U.S.C. 154(b) by 48 days.

(21) Appl. No.: 11/113,292

(22) Filed: Apr. 25, 2005

(65) Prior Publication Data

US 2006/0236677 A1  Oct. 26, 2006

(51) Int. Cl.
*F01N 3/00* (2006.01)

(52) U.S. Cl. .............................. 60/276; 60/277; 60/285; 73/23.33; 123/688; 123/690; 701/107; 701/109

(58) Field of Classification Search ................... 60/277, 60/274, 276, 285; 73/23.32, 23.33; 123/688, 123/690; 701/107, 109, 115

See application file for complete search history.

(56) References Cited

U.S. PATENT DOCUMENTS

| | | | | |
|---|---|---|---|---|
| 5,749,222 | A * | 5/1998 | Nakajima et al. | 60/274 |
| 6,012,282 | A * | 1/2000 | Kato et al. | 60/274 |
| 6,017,503 | A | 1/2000 | Kato et al. | |
| 6,209,315 | B1 | 4/2001 | Weigl | |
| 6,266,956 | B1* | 7/2001 | Suzuki et al. | 60/278 |
| 6,295,862 | B1* | 10/2001 | Kurokawa et al. | 73/31.05 |
| 6,455,009 | B1 | 9/2002 | Kato et al. | |
| 6,547,955 | B1* | 4/2003 | Hada et al. | 205/781 |
| 6,635,161 | B2 | 10/2003 | Inagaki | |
| 6,638,405 | B2* | 10/2003 | Jain et al. | 204/421 |
| 6,757,608 | B2 | 6/2004 | Gross et al. | |
| 7,034,711 | B2* | 4/2006 | Sakatani et al. | 340/686.1 |
| 7,050,902 | B1* | 5/2006 | Bolz | 701/114 |
| 7,073,320 | B2* | 7/2006 | Moritsugu et al. | 60/276 |
| 7,142,976 | B2* | 11/2006 | Inoue et al. | 701/114 |
| 7,263,823 | B2* | 9/2007 | Andrews et al. | 60/288 |
| 2002/0103592 | A1 | 8/2002 | Gross et al. | |
| 2002/0162743 | A1 | 11/2002 | Inagaki | |
| 2003/0024332 | A1* | 2/2003 | Traphagen et al. | 73/866.5 |
| 2005/0284136 | A1 | 12/2005 | Plougmann | |

FOREIGN PATENT DOCUMENTS

| | | |
|---|---|---|
| DE | 100 48 808 A1 | 4/2002 |
| DE | 100 47 512 A1 | 8/2002 |
| DE | 103 28 014 A1 | 1/2005 |
| EP | 1 435 458 A1 | 7/2004 |
| JP | 3-272450 | 12/1991 |
| JP | 10-33948 | 2/1998 |
| JP | 11-304758 | 11/1999 |
| JP | 2002-71640 | 3/2002 |
| WO | WO 99/42717 | 8/1999 |
| WO | WO 02/25074 A1 | 3/2002 |

\* cited by examiner

*Primary Examiner*—Binh Q. Tran
(74) *Attorney, Agent, or Firm*—Sughrue Mion, PLLC (57) ABSTRACT

A sensor control device is connected with a plurality of exhaust sensors including an NOx sensor to be disposed around a catalyst, and is constructed such that a plurality of drive control circuits to be connected in a one-to-one relationship with the individual gas sensors are disposed in one casing. The sensor control device is provided with a communication output section that outputs signals through a digital communication line so that the signal transmissions/receptions with an ECU may be executed through the digital communication line. This digital communication line is physically a one-system cable but can transmit and receive signals of a plurality of kinds with predetermined communication protocols.

2 Claims, 7 Drawing Sheets

SENSOR CONTROL DEVICE

BACKGROUND OF THE INVENTION

1. Field of the Invention

The present invention relates to a sensor control device for driving/controlling a plurality of exhaust sensors mounted around a catalyst disposed in the exhaust passage of an internal combustion engine and for outputting sensor signals according to electric signals outputted by the exhaust sensors, to an external device.

2. Description of the Related Art

In recent years, a lean burn engine or a direct injection engine having an air/fuel ratio controlled to a leaner side than a stoichiometric value has been developed with a view to improving the fuel economy or the like. The engine of this type has a tendency to have more emission of nitrogen oxides (NOx) than that of the ordinary engine, and there have been proposed systems for the counter-measures.

One proposal is a system which is provided with a NOx occluding/reducing catalyst in the exhaust passage thereby to reduce the NOx emissions. The NOx occluding/reducing catalyst is characterized to occlude the NOx when the air/fuel ratio of the exhaust gas is lean and to reduce and release the occluded NOx when the air/fuel ratio is rich. The system adopting this catalyst executes an operation to enrich the air/fuel ratio intermittently during the lean run thereby to reduce the NOx occluded by the catalyst. In another system proposed, a NOx selective reducing catalyst is disposed in the exhaust passage, and a tank separately disposed in the vehicle is filled with urea water as a reducer solvent and injected into the catalyst so as to reduce the NOx into a harmless gas such as $N_2$ or the like.

The internal combustion engine carrying such systems is provided with a plurality of exhaust sensors around the aforementioned catalyst (i.e., the NOx occluding/reducing catalyst or the NOx selective reducing catalyst) disposed in the exhaust passage, with a view to executing the operations such as the operation to reduce the NOx, the operation to diagnose the state (i.e., deterioration or trouble) of the catalyst and the control operation to control the air/fuel ratio. Specifically, not only a NOx sensor for measuring the NOx concentration in the exhaust gas is disposed on the downstream side of the catalyst, but also at least one of exhaust sensors including an overall air/fuel ratio sensor, a temperature sensor and a pressure sensor is disposed on the upstream or downstream side of the catalyst.

Herein, the sensors disposed in the exhaust passage for detecting pieces of information on the exhaust gas (e.g., the concentration and temperature of a specific gas), such as the NOx sensor, the overall air/fuel ratio sensor, the temperature sensor and the pressure sensor will be called altogether as the "exhaust sensors".

Here is known an internal combustion engine having the construction, in which the electric signals outputted by the individual exhaust sensors are transmitted to an electronic control unit (as will also be called the "ECU") for controlling the various control operations such as the ignition control operation and the aforementioned air/fuel ratio control. In this construction, a sensor control device for driving/controlling the exhaust sensors and for outputting sensor signals according to the electric signals outputted by the exhaust sensors, to the ECU is mounted in the form of an external unit.

Here, the sensor control device of the related art is disposed for each exhaust sensor. In the internal combustion engine having a plurality of exhaust sensors, a plurality of sensor control devices transmit the sensor signals individually to the ECU (as referred to JP-A-3-272450 (FIG. 2)).

Of the exhaust sensors mounted around the catalyst, the aforementioned NOx sensor is generally provided with a detection element which includes a first oxygen pumping cell, an oxygen concentration measuring cell and a second oxygen pumping cell having a pair of porous electrodes on a solid electrolyte layer. However, an electric current (or a current signal) to flow through the second oxygen pumping cell in accordance with the NOx concentration is as minute as 1 [mA] or less. If the NOx sensor and the ECU are directly connected through a signal cable, therefore, there arises a problem that the detection precision of the NOx concentration is lowered by the resistance loss due to the signal cables, the electric noises, the electric wave noises and so on. In case the NOx sensor is mounted in the exhaust passage, therefore, it has been investigated (as referred to JP-A-11-304758) to prepare the sensor control device as the external unit including the NOx sensor drive circuit and to dispose the sensor control device in the vicinity of the NOx sensor thereby to transmit the sensor signal to the ECU.

SUMMARY OF THE INVENTION

Here, the sensor control device of the related art is connected with the exhaust sensors and the ECU individually through signal cables made of lead wires, and the electric signals outputted by the exhaust sensors and the sensor signals outputted by the sensor control device are generally transmitted as the voltage signals or current signals of an analog type. However, the ECU is frequently mounted in or near the engine room thereby to enlarge the distances from the exhaust sensors around the catalyst disposed under the vehicle floor to the ECU. This makes it necessary to elongate the signal cables from the exhaust sensors to the sensor control device or the signal cables from the sensor control device to the ECU. Even if the signal cables for connecting the NOx sensor and the sensor control device are set short in the NOx sensor, the signal cables for connecting the sensor control device and the ECU are elongated in sizes.

In the case of using those long signal cables of the analog type, on the other hand, the characteristics of the signal output values are liable to change due to the aging of the signal cables themselves, the aging of the contact resistance of the intermediate connectors inserted midway of the cables, and so on. In the case of using relatively long signal cables of the analog type, the communication precision of signals has a tendency to be deteriorated especially by the long-term use of the internal combustion engine (or the vehicle). If the communication precision of the signals is thus deteriorated, the fluctuations of the signal output values are caused in the communication procedure to the ECU although the exhaust sensors outputted proper electric signals. As a result, the proper engine control may not be executed to invite the deterioration in the exhaust emissions in the worst case.

The present invention has been conceived in view of those problems and has, therefore, an object to provide a sensor control device which is connected as an outboard unit with a plurality of exhaust sensors disposed around a catalyst of an exhaust passage and which can suppress reduction in the communication precision of signals.

In order to achieve this object, according to a first aspect of the invention, there is provided a sensor control device for controlling at least two exhaust sensors mounted around a catalyst disposed in an exhaust passage of an internal combustion engine, the sensor control device comprising: a plurality of drive control circuits connected in a one-to-one relation with the exhaust sensors, each of the plurality of drive control circuits being for driving/controlling each of the exhaust sensors and being for outputting sensor signals, each of the sensor signals corresponding to each of electric signals outputted by each of the exhaust sensors; a microcomputer connected with the plurality of drive control circuits, the microcomputer being for acquiring the sensor signals; and a communication output section that outputs a plurality of signals containing at least one of the sensor signals acquired by the microcomputer, to an external device through a digital communication line, wherein the exhaust sensors comprises at least one weak signal output sensor that outputs a weak signal having one of a maximum current value of 1 [mA] or less and a maximum voltage of 100 [mV] or less, as a first electric signal which is one of the electric signals, and wherein the sensor control device further comprises a casing that houses the plurality of drive control circuits, the microcomputer and the communication output section.

The sensor control device of the invention is connected with the weak signal output sensor for outputting a weak signal having either a maximum current value of 1 [mA] or less or a maximum voltage of 100 [mV] or less. However, this sensor control device thus connected with the weak signal output sensor is troubled by such a problem that the communication precision (or the output precision) is deteriorated by the resistance loss or the like of the weak electric signals through the signal cables when the signal cables connecting that sensor and the sensor control device are elongated. Therefore, the sensor control device has to be disposed near the weak signal output sensor (or near the catalyst) thereby to transmit the sensor signals according to the electric signals outputted by the exhaust sensor, to the external device.

At first in the invention, therefore, the sensor control device is disposed in the vicinity of the catalyst so that the exhaust sensors other than the weak signal output sensor and mounted around the catalyst are also connected with that sensor control device. Specifically in the invention, the plural drive control circuits to be connected in the one-to-one relationship with the plural exhaust sensors are housed in one casing constructing the sensor control device, so that the plural exhaust sensors including the weak signal outer sensor may be driven and controlled by that one sensor control device. As a result, it is possible to set short as a whole the sizes of the signal cables connecting the individual exhaust sensors and the sensor control device.

Secondly, the sensor control device is provided with the communication output section that outputs the digital signals and is constructed such that the signal transmissions/receptions between itself and the external device are executed through the digital communication line.

As a result, the signal transmissions/receptions between the sensor control device and the external device can be performed while solving the problem which might otherwise be caused when such relatively long signal cables of the analog type are used that the output signal characteristics are changed due to the aging of the wiring resistances and the contact resistors or the like of the intermediate connectors.

By using the sensor control device of the invention, therefore, the signal cables for connecting the plural exhaust sensors and the sensor control device can be set short. The signal transmissions/receptions between the sensor control device mounted in the vicinity of the catalyst and the external device disposed at a remote position are performed by using the digital communication line so that the deterioration in the signal communication precision between the sensor control device and the external device can be suppressed.

Moreover, the sensor control device of the invention is constructed such that the plural drive control circuits, the microcomputer and the communication output section are housed in one casing. This makes it unnecessary even for the internal combustion engine having the plural sensors to be provided with the sensor control device (or the casing constructing the sensor control device) for each sensor. As a result, the arranging area (or the arranging space) of the sensor control device can be made smaller than that of the case, in which the internal combustion engine is provided with the plural sensor control devices, so that the internal combustion engine can be small-sized.

Here, the number of catalysts to be mounted in the exhaust passage should not be limited to one, but the catalysts can be specifically exemplified by a NOx occluding/reducing catalyst, a ternary catalyst, a NOx selective reduction catalyst, a PM oxide catalyst and so on.

If the sensor control device is integrally and irremovably connected with the plural exhaust sensors, it is necessary to replace all the exhaust sensors and the sensor control devices even in case any one of the exhaust sensors is troubled or broken. This necessity causes a problem of deficient maintenance performance.

In the sensor control device according to a second aspect of the invention, the sensor control device further comprises a plurality of sensor connecting connectors connected in a one-to-one relationship with connectors of the exhaust sensors in a signal passage connected from the plurality of drive control circuits with the exhaust sensors, wherein each of the plurality of sensor connecting connectors can connect each of connectors of the exhaust sensors removably.

As a result, the sensor control device of the invention is constructed such that the plural exhaust sensors can be individually replaced one by one. It is, therefore, possible to lower the cost for the repair at the time of a trouble or breakage of the exhaust sensors thereby to improve the maintenance performance.

In the sensor control device according to a third aspect of the invention, the weak signal output sensor may be a NOx sensor having the maximum current value of 1 [mA] or less for the first electric signal, the first electric signal being outputted by measuring NOx concentration in exhaust gas flowing in the exhaust passage.

Of the exhaust sensors disposed around the catalyst, the NOx sensor has a small current value for the electric signal to be outputted at the time of measuring the NOx concentration, as described above. When the current signals to be outputted form the NOx sensor are to be transmitted to the external device, therefore, the influences of the noises or the like can be reduced to suppress the reduction in the communication precision by using the sensor control device of the invention.

In the aforementioned sensor control device according to a fourth aspect of the invention, moreover, a signal cable connecting the weak signal output sensor and one of the drive control circuits which is connected electrically with the weak signal output sensor is 2 meters or less.

By thus regulating the signal cables connecting the weak signal output sensor and the drive circuit housed in the casing of the sensor control device within 2 meters or less, the influences of the noises on the electric signals to be outputted from the weak signal output sensor to the drive control circuits through the signal cables can be effectively reduced. By regulating the lengths of the signal cables between the weak signal output sensor and the drive control circuit, moreover, it is possible to set shorter the length of the signal cable connecting the sensor control device disposed near the catalyst and another exhaust sensor thereby to suppress the increase in the total volume of the signal cables.

Here, the external device to be connected with the sensor control device can be represented by the electronic control unit (ECU). Moreover, this ECU executes many control operations for controlling the internal combustion engine synthetically, such as the air/fuel ratio control operation, the ignition control operation, the combustion cylinder discriminating operation, the operation to refresh the catalyst in case the NOx occluding/reducing catalyst is used, and so on. Thus in the ECU, the loads on the operations accompanying the increase in the control operations becomes more serious in recent years.

In the sensor control device according to a fifth aspect of the invention, the microcomputer may include a catalyst state detecting section that detects a state of said catalyst on the basis of at least one of said sensor signals, each of said sensor signals being outputted by each of said drive control circuits, to output a catalyst state signal indicating the catalyst state detected, to said communication output section, and said communication output section outputs said catalyst state signal to said external device through said digital communication line.

Thus, the microcomputer is provided with the catalyst state detecting section, and the operation to detect the catalyst state is executed in the sensor control device. As a result, the operation to detect the catalyst state need not be executed by the external device so that the load on the control operation in the electronic control unit can be reduced. The method for detecting and outputting the catalyst state by the sensor control device can be exemplified in the following. In case the NOx occluding/reducing catalyst is disposed in the exhaust passage, the NOx occluding amount of the catalyst is estimated by the microcomputer constructing the sensor control device, on the basis of the electric signals from the NOx sensor disposed on the downstream side of the catalyst. At the instant when a predetermined occluding amount is estimated, a predetermined catalyst state signal can be outputted to the external device (ECU) through the communication output section.

DETAILED DESCRIPTION OF THE INVENTION

Embodiments, to which the present invention is applied, will be described with reference to the accompanying drawings.

An embodiment will be described on a sensor control device to be attached to an internal combustion engine, that is, a sensor control device for controlling a plurality of exhaust sensors which are mounted around a catalyst of an exhaust passage.

Figure 1:
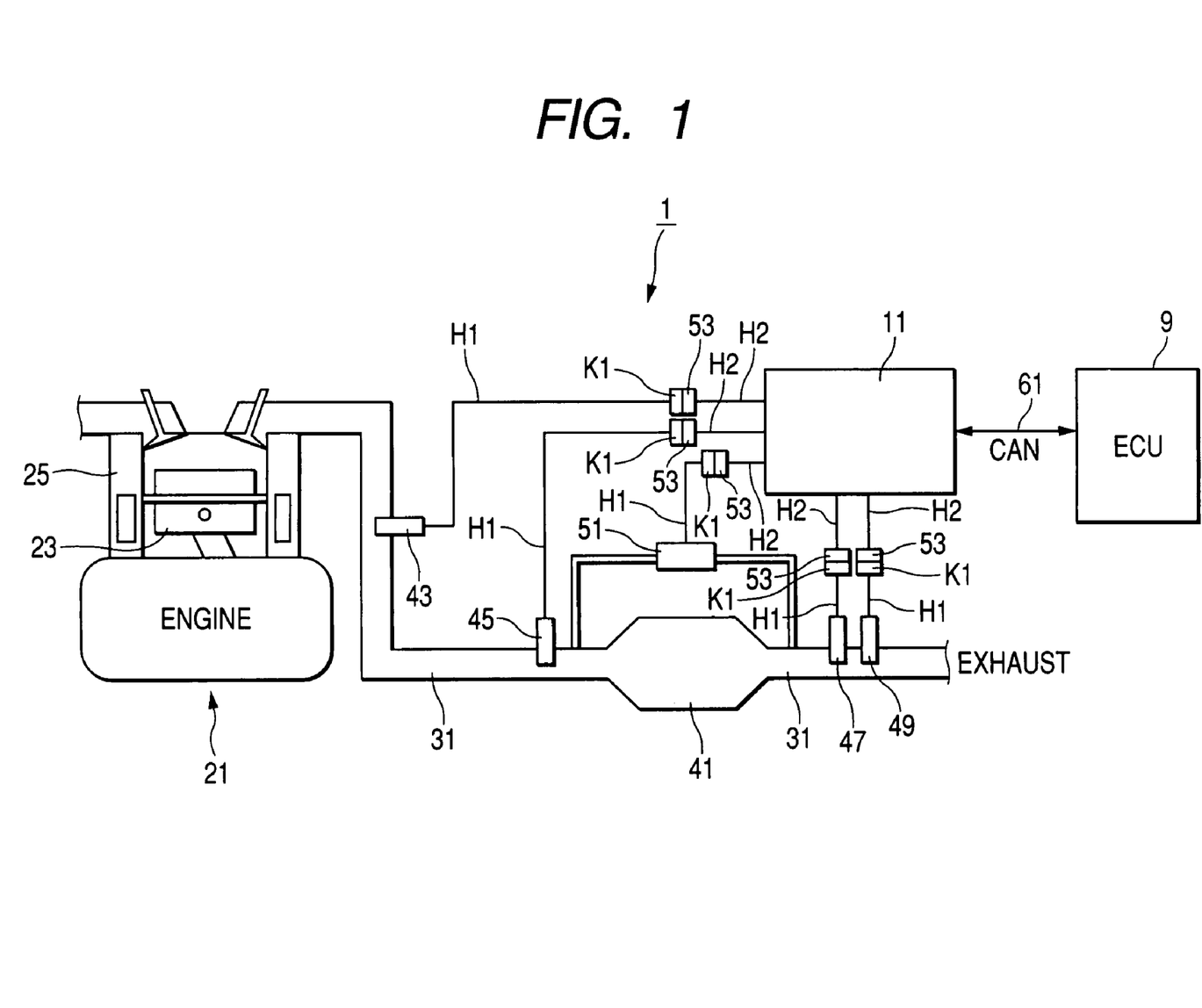
FIG. 1 is an explanatory diagram showing a schematic construction around the exhaust system of an internal combustion engine provided with a sensor control device.

FIG. 1 is an explanatory diagram showing a schematic construction around the exhaust system of an internal combustion engine 1 which is provided with a sensor control device 11.

The internal combustion engine 1 is constructed to include: an engine unit 21 provided with a piston 23, a cylinder 25 and the like; an exhaust pipe 31 for releasing the exhaust gas discharged from the engine unit 21, to the outside; a catalyst 41 disposed in the exhaust passage of the exhaust pipe 31; a sensor control device 11 for driving and controlling a plurality of exhaust sensors 43, 45, 47, 49 and 51 mounted around the catalyst 41; and an electronic control unit 9 (as will also be called the "ECU 9") connected with the sensor control device 11 through a digital communication line 61.

Of these, the catalyst 41 is a NOx occluding/reducing catalyst which is characterized to occlude NOx, when the air/fuel ratio in the exhaust gas of the exhaust pipe 31 is lean, and to reduce and release the occluded NOx when the air/fuel ratio becomes rich. Moreover, the catalyst 41 is further provided with a DPF (i.e., Diesel Particulate Filter or a particulate removing filter) for removing soot in the exhaust gas.

On the other hand, the internal combustion engine 1 is provided with: the overall air/fuel ratio sensor 43 disposed as the exhaust sensor at a position in the exhaust pipe 31 close to the engine unit 21 (or the combustion chamber); the first temperature sensor 45 disposed in the exhaust pipe 31 upstream of the catalyst 41; and the second temperature sensor 47 and the NOx sensor 49 in the exhaust pipe 31 downstream of the catalyst 41. The internal combustion engine 1 is further provided with the differential pressure sensor 51 which is disposed as the exhaust sensor at a position in the exhaust pipe 31 in parallel with the catalyst 41 so as to detect the pressure difference between the upstream side and the downstream side of the catalyst 41.

The overall air/fuel ratio sensor 43, the first temperature sensor 45, the second temperature sensor 47, the NOx sensor 49 and the differential pressure sensor 51 are connected with the sensor control device 11 through signal cables H1 (of an analog type) and connectors K1, which are provided individually of one another.

On the other hand, the sensor control device 11 is provided with sensor connecting connectors 53, which are connected in a one-to-one relationship with the connectors K1 of the individual exhaust sensors 43, 45, 47, 49 and 51. The sensor connecting connectors 53 are connected with a later-described drive control circuit 13 through signal cables H2 (of an analog type). Moreover, the sensor connecting connectors 53 are made to have such a structure that the connectors K1 of the exhaust sensors can be removably connected therewith. Thus, the exhaust sensors 43, 45, 47, 49 and 51 can be individually disconnected from the sensor control device 11 (or the sensor connecting connectors 53). Here, each exhaust sensor is provided with the signal cables Hi in such a number that they are connected in a one-to-one relationship with the individual exhaust sensors. In FIG. 1, however, the signal cables Hi are so schematically shown as the one-line signal cable Hi that they can be easily understood. This discussion likewise applies to the signal cables H2.

The overall air/fuel ratio sensor 43 is provided for detecting the oxygen concentration or air/fuel ratio in the exhaust gas and is used for controlling the air/fuel ratio. This overall air/fuel ratio sensor 43 is combined with the later-described drive control circuit 13 so as to output a current value UIp varying with the oxygen concentration or air/fuel ratio in the exhaust gas.

The first temperature sensor 45 and the second temperature sensor 47 are provided for managing the activation temperature of the catalyst 41, for managing the exhaust gas temperature (or the DPF temperature) at the DPF refreshing time (i.e., at the time burning-and removing the soot stored), and the like.

On the other hand, the differential pressure sensor 51 detects the exhaust pressure difference of the DPF between the upstream side and the downstream side. The exhaust pressure difference detected is used for determining the clogging with the DPF or for detecting the DPF trouble.

The NOx sensor 49 is so constructed in combination with a later-described drive control circuit 77 as to output a first detected current value NIp1 varying with the oxygen concentration or air/fuel ratio in the exhaust gas and a second detected current value NIp2 varying with the NOx concentration in the exhaust gas. The NOx sensor 49 is provided for detecting the oxygen concentration and the NOx concentration in the exhaust gas on the downstream side of the catalyst 41. Moreover, the oxygen concentration and the NOx concentration detected by the NOx sensor 49 are used for detecting and controlling the state of the catalyst 41. Here in the NOx sensor 49, the NOx concentration to be detected is generally several tens to several hundreds ppm, and the corresponding magnitude of the current value NIp2 is as small as several hundreds [μA] to several [μA]. This NOx sensor 49 corresponds to the "minute current output sensor" in the Claims.

The sensor control device 11 is so disposed in this embodiment within a range of a radius of 1 meter from the catalyst 41 that the length of the signal cable connecting the NOx sensor 49 for outputting a minute electric signal and the later-described drive control circuit 77 (that is, the total length of the signal cables H1 and the signal cables H2) may satisfy 2 meters or less. On the basis of the electric signals to be outputted from the individual exhaust sensors 43, 45, 47, 49 and 51 around the catalyst 41, moreover, the sensor control device 11 executes the control to detect the state of the catalyst 41, the control to transmit a demand (or a refreshing demand) for removing the NOx of the catalyst 41 to the ECU 9, and the like.

In this embodiment, since the sensor control device 11 is disposed in the vicinity of the NOx sensor 49, a distance between the sensor control device 11 and ECU 9 is longer than a distance between the sensor control device 11 and NOx sensor 49.

Here will be later described the contents of the control to be executed by the sensor control device 11 and the detailed internal construction of the sensor control device 11.

The electronic control unit 9 executes the operations to detect the states of the individual portions on the basis of the detected results of the various sensors disposed in the individual portions of the internal combustion engine, and the various control operations for controlling the internal combustion engine synthetically.

Figure 2:
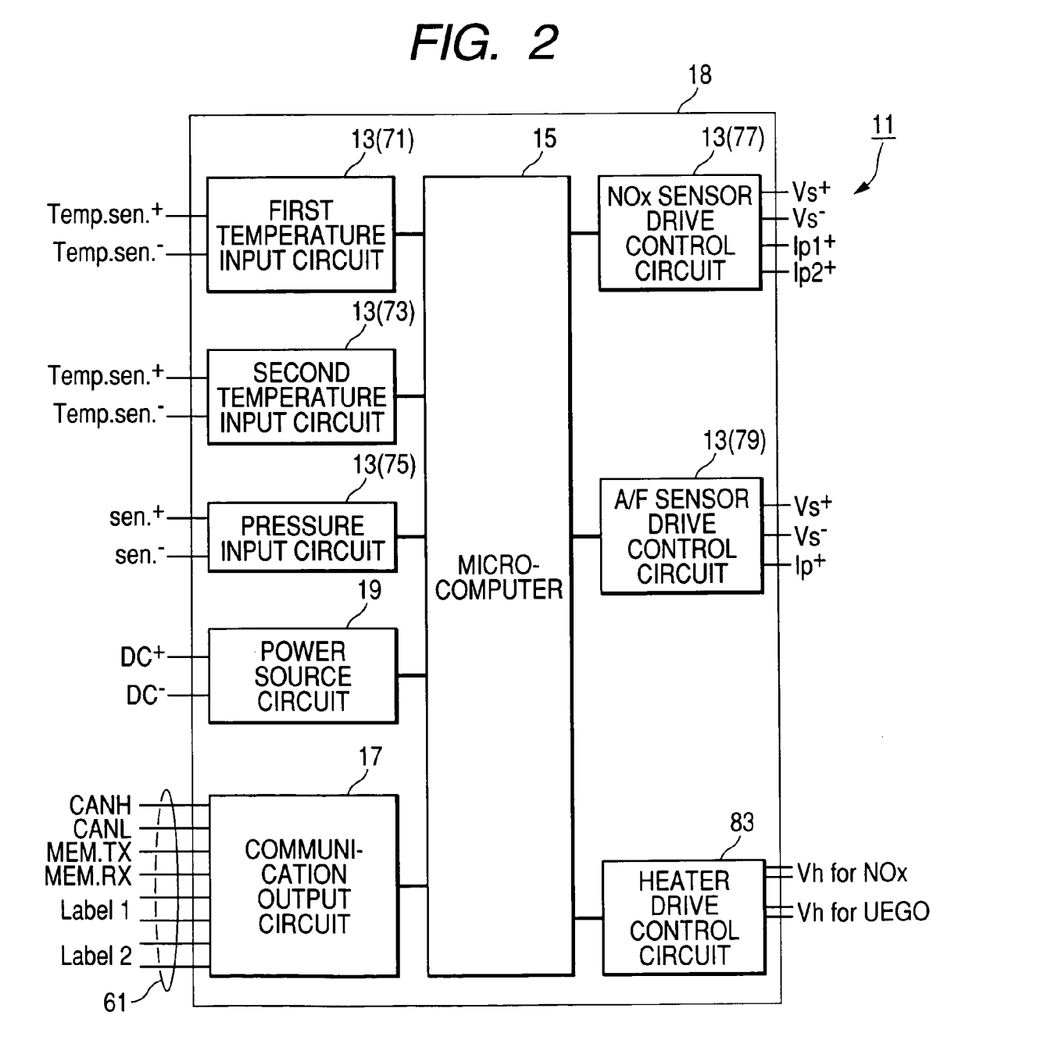
FIG. 2 is a construction diagram showing the internal construction of the sensor control device.

Next, the internal construction of the sensor control device 11 is described in the following. FIG. 2 is a construction diagram showing the internal construction of the sensor control device 11.

The sensor control device 11 is provided with: a plurality of drive control circuits 13 connected in a one-to-one relationship with the individual exhaust sensors 43, 45, 47, 49 and 51; a microcomputer 15 for executing the control operations on the basis of the sensor signals and so on coming from the drive control circuit 13; a communication output circuit 17 for outputting a plurality of signals including at least one of the sensor signals acquired by the microcomputer 15, to the ECU 9 through the digital communication line 61; a power source circuit 19 for feeding the electric power to the individual portions of the sensor control device 11; and a heater drive control circuit 83 for controlling the heaters of the NOx sensor 49 and the overall air/fuel ratio sensor 43.

Figure 6:
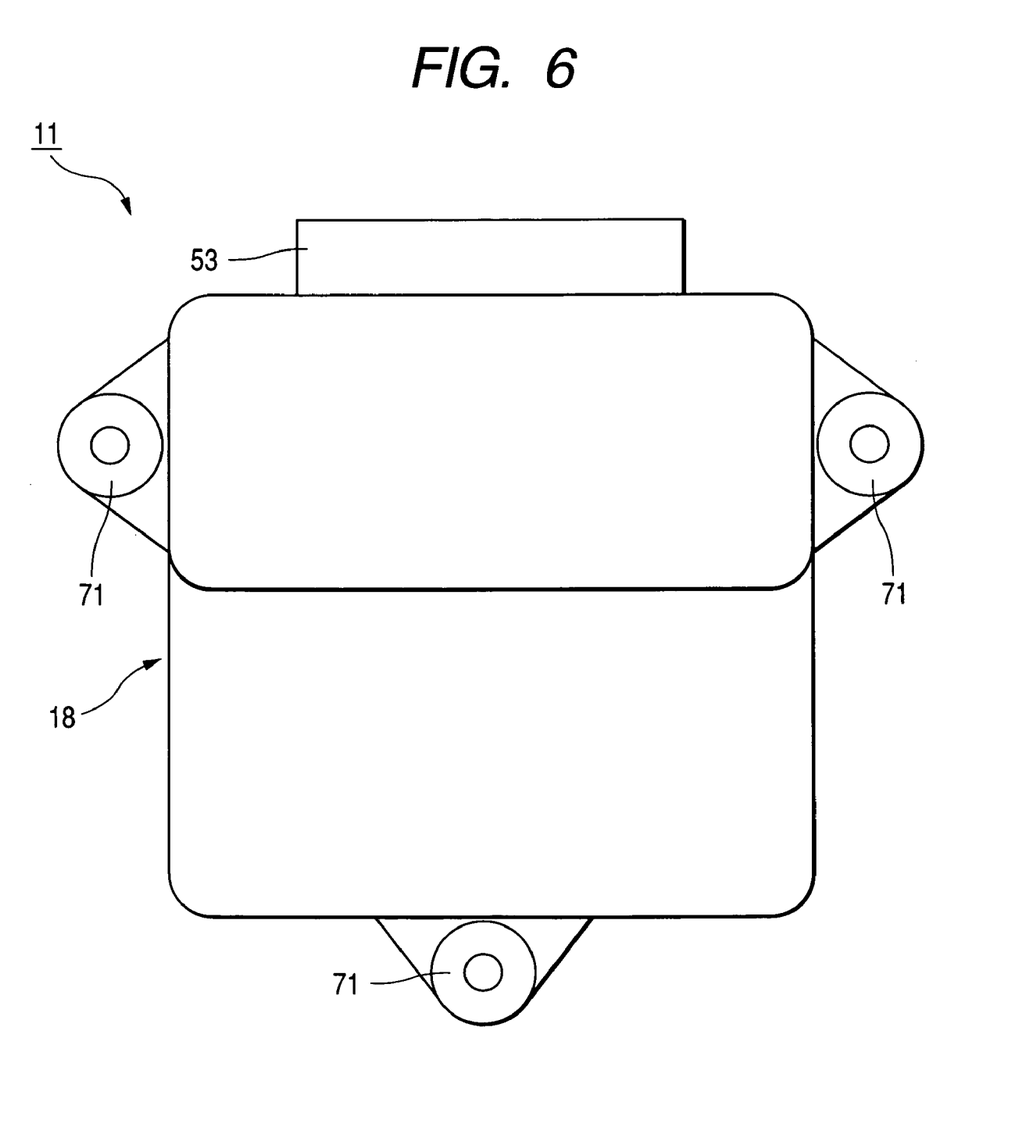
FIG. 6 is a plan view of an exterior of the control device.
Figure 7:
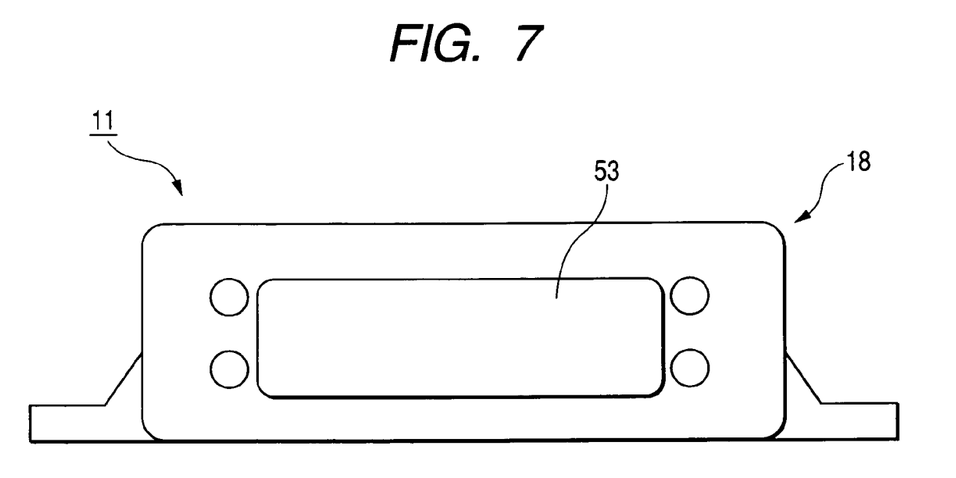
FIG. 7 is a front view of the exterior of the control device.
Figure 8:
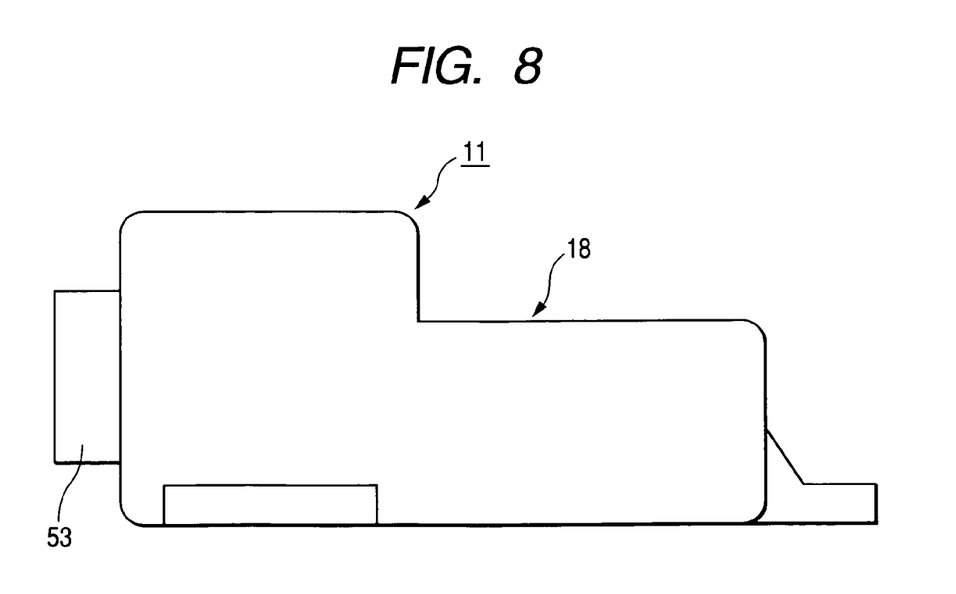
FIG. 8 is a side view of the exterior of the control device.

The sensor control device 11 is further provided with a casing 18 for housing those circuits and the microcomputer 15 inside. This casing 18 is made mainly of a refractory material for preventing the thermal damage. FIG. 6 is a plan view of an exterior of the control device. FIG. 7 is a front view of an exterior of the control device. FIG. 8 is a side view of an exterior of the control device. As shown in FIG. 6, attaching portions 71 for threadably mounting the sensor control device 11 on the vehicle are provided in the casing 18 by way of integral moulding.

Moreover, the sensor control device 11 is provided as the drive control circuits 13 with a first temperature input circuit 71, a second temperature input circuit 73, a pressure input circuit 75, a NOx sensor drive control circuit 77 and a A/F sensor drive control circuit 79.

The first temperature input circuit 71 is connected with the first temperature sensor 45 so as to transmit the sensor signal according to the exhaust gas temperature on the upstream side of the catalyst 41, to the microcomputer 15 on the basis of the electric signal outputted by the first temperature sensor 45. The second temperature input circuit 73 is connected with the second temperature sensor 47 so as to transmit the sensor signal according to the exhaust gas temperature on the downstream side of the catalyst 41, to the microcomputer 15 on the basis of the electric signal outputted by the second temperature sensor 47.

The pressure input circuit 75 is connected with the differential pressure sensor 51 so as to transmit the sensor signal according to the pressure difference in the exhaust pipe 31 between the upstream side and the downstream side of the catalyst 41, to the microcomputer 15 on the basis of the electric signal outputted by the differential pressure sensor 51.

The NOx sensor drive control circuit 77 is connected with the NOx sensor 49 so as to transmit the sensor signal according to the oxygen concentration in the exhaust gas on the downstream side of the catalyst 41 and the sensor signal according to the NOx concentration, to the microcomputer 15 on the basis of the electric signal outputted by the NOx sensor 49.

The A/F sensor drive control circuit 79 is connected with the overall air/fuel ratio sensor 43 so as to transmit the sensor signal according to the oxygen concentration or the air/fuel ratio in the exhaust gas, just after discharged from the combustion chamber, to the microcomputer 15 on the basis of the electric signal outputted by the overall air/fuel ratio sensor 43.

On the other hand, the communication output circuit 17 is so constructed as to perform bidirectional communications with the ECU 9 through the digital communication line 61 thereby to transmit signals containing various pieces of information to the ECU 9 and to receive signals containing various pieces of information from the ECU 9. Here, this embodiment uses the CAN (Controller Area Network) or the international standard protocols standardized as ISO11898, for the communication protocols in the digital communication line 61.

Of the control operations to be executed by the microcomputer 15, here will be described the catalyst state detecting operations to be executed for detecting the state of the catalyst 41. Meanwhile, the microcomputer 15 is given the wellknown construction including the CPU, the RAM for storing the programs or data temporarily, the ROM for storing the programs or data, and the A/D converter.

Figure 3:
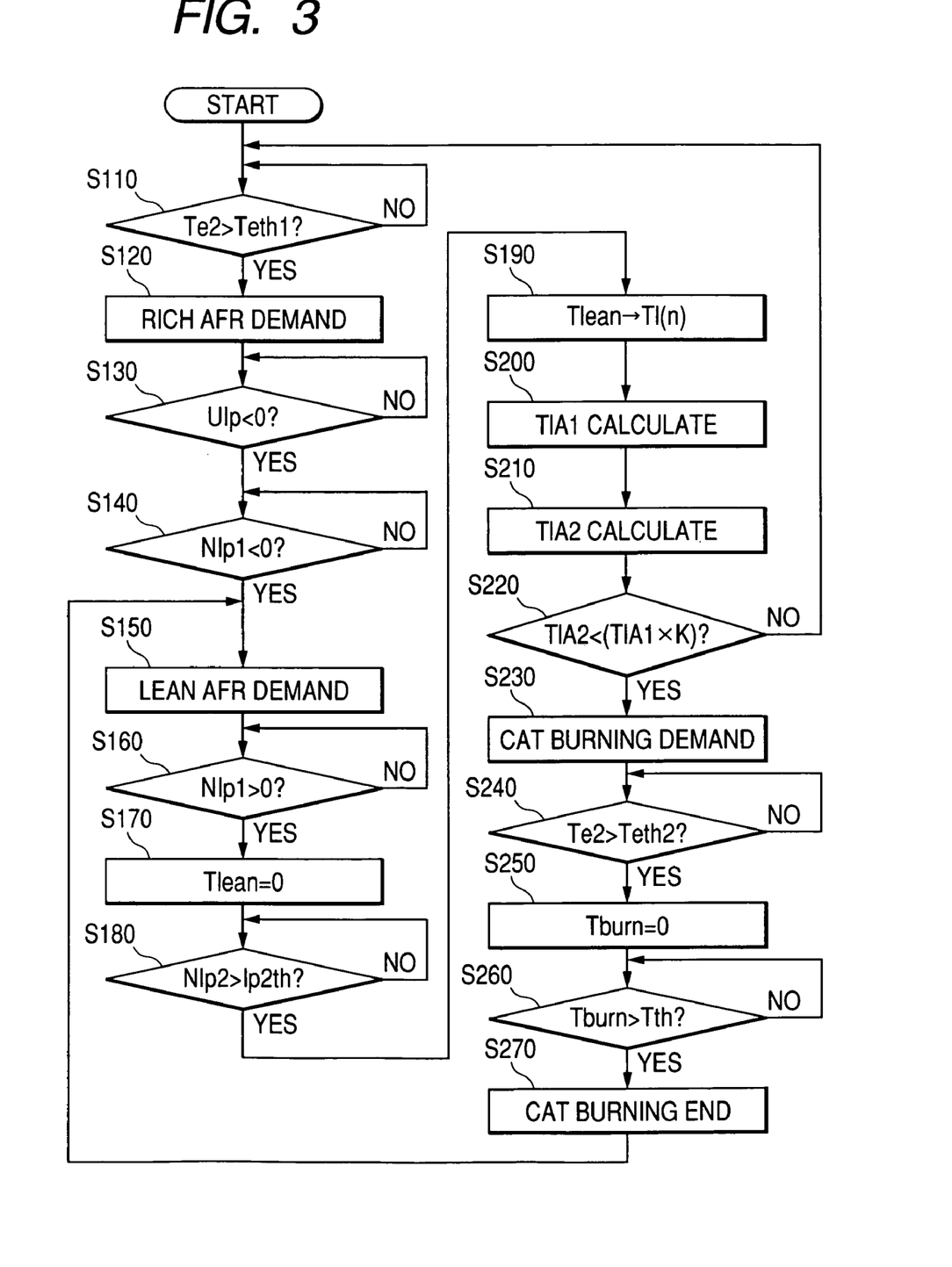
FIG. 3 is a flow chart showing the processing contents of catalyst state detecting operations.
Figure 4:
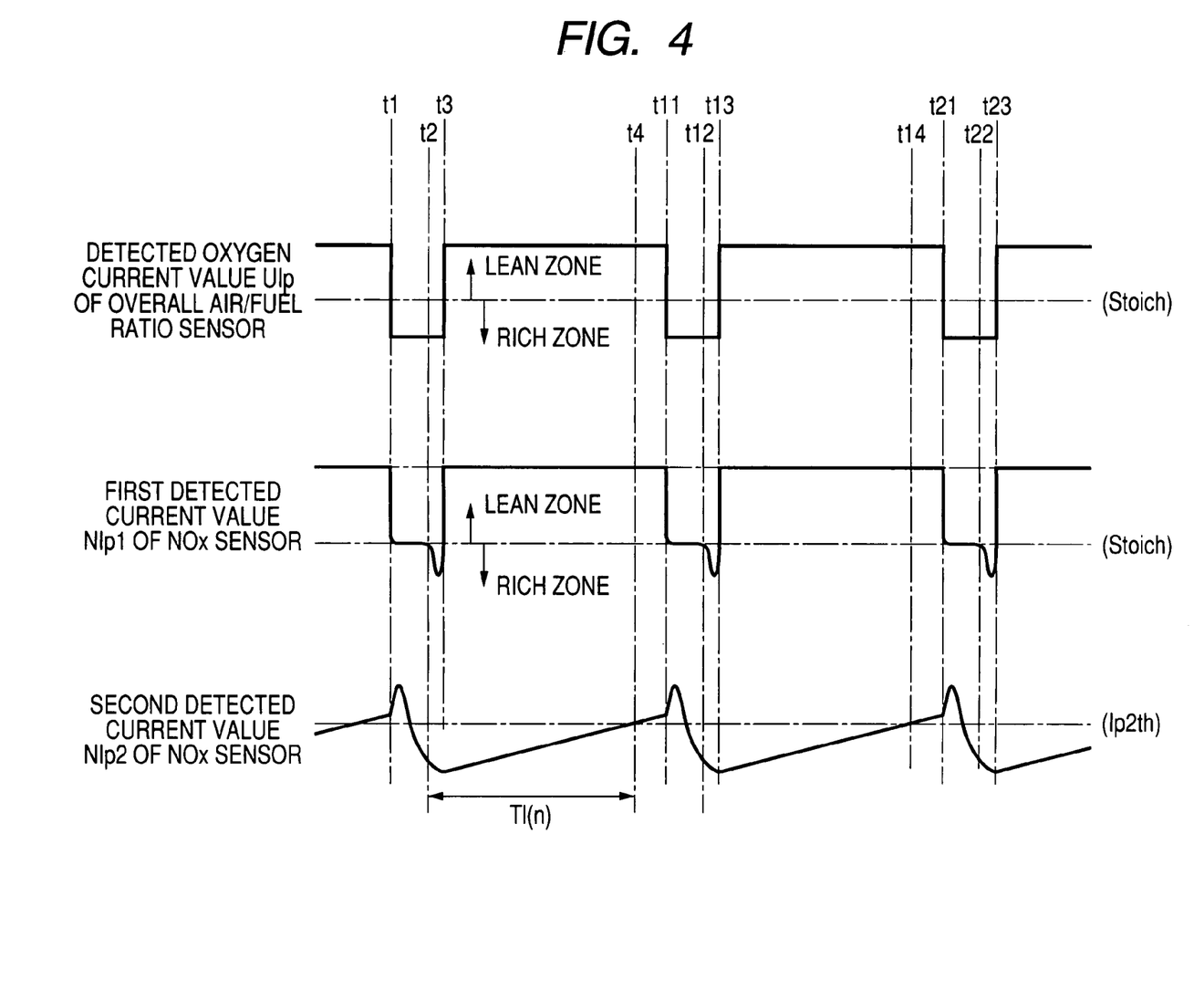
FIG. 4 is a time chart showing the varying states of the individual portions at the time of executing the catalyst state detecting operations (e.g., the varying states of the individual values, i.e., the detected current value UIp of an overall air/fuel ratio sensor, and a first detected current value NIp1 and a second detected current value NIp2 of the NOx sensors)

FIG. 3 is a flowchart showing the processing contents of the catalyst state detecting operations. FIG. 4 is a time chart showing the varying states of the individual portions at the time of executing the catalyst state detecting operations (e.g., the varying states of the individual values, i.e., the detected current value UIp of the overall air/fuel ratio sensor 43, the first detected current value NIp1 and the second detected current value NIp2 of the-NOx sensor 49).

Here, the microcomputer 15 executes the operations for storing an n-number (e.g., five hundreds) of lean holding time Tl(n) before the catalyst state detecting operations. A lean holding time Tlean corresponds, in a lean air/fuel ratio state, to a duration time just after the catalyst 41 is refreshed and before the catalyst 41 comes into the NOx occlusion-saturated state, so that it can be utilized as a decision index for deciding the deterioration state of the catalyst 41.

When the catalyst state detecting operation is started, it is decided at first S110 (wherein S indicates a step) whether or not a catalyst downstream gas temperature Te2 is higher than a catalyst activation temperature Teth1 (e.g., 300[° C.]). In case the answer of S110 is YES, the routine transfers to S120. In case the answer is NO, the operation of S110 is repeatedly executed for a standby till the catalyst downstream gas temperature Te2 becomes higher than the catalyst activation temperature Teth1.

When the catalyst downstream gas temperature te2 becomes higher than the catalyst activation temperature Teth1, it can be decided that the catalyst 41 is in the active state (in which the catalyst 41 can occlude NOx).

At S120, a demand signal (i.e., a rich air/fuel ratio demanding signal) for enriching the air/fuel-ratio is transmitted to the ECU 9. As a result, the microcomputer 15 outputs the rich air/fuel ratio demand signal to the communication output circuit 17, and the communication output circuit 17 transmits the rich air/fuel ratio demand signal to the ECU 9 through the digital communication line 61.

When the ECU 9 receives the rich air/fuel ratio demand signal, it increases the ratio of the fuel in the fuel mixture to enrich the air/fuel ratio.

At subsequent S130, it is decided whether or not the detected current value UIp by the overall air/fuel ratio sensor 43 is smaller than 0 [mA]. In case the answer of S130 is YES, the routine transfers to S140. In case the answer is NO, the operation of S130 is repeatedly executed for a standby till the detected current value UIp becomes smaller than 0 [mA].

When the detected current value UIp is smaller than 0 [mA], it can be decided that the combustion state (or the air/fuel ratio) of the fuel has be controlled to a rich zone. In the rich air/fuel ratio zone, moreover, much HC is contained in the exhaust gas discharged from the combustion chamber. When the exhaust gas (or the rich gas) is fed to the catalyst 41, therefore, the NOx occluded by the catalyst 41 (i.e., the NOx occluding/reducing catalyst contained in the catalyst 41) chemically reacts with the HC contained in the rich gas so that it is reduced (as $NOx+HC \rightarrow H_2O+CO_2+N_2$). As a result, the catalyst 41 is cleared of the NOx.

In FIG. 4, at time t1, the air/fuel ratio is controlled to a rich zone.

At next S140, it is decided whether or not the first detected current value NIp1 by the NOx sensor 49 is smaller than 0 [mA]. In case the answer of S140 is YES, the routine transfers to S150 In case the answer is NO, the operation of S140 is repeatedly executed for a standby till the first detected current value NIp1 becomes smaller than 0 [mA].

Here the first detected current value NIp1 varies with the oxygen concentration in the exhaust gas on the downstream side of the catalyst 41. When the first detected current value NIp1 is smaller than 0 [mA], it can be decided that the NOx occluded by the catalyst 41 has been wholly reduced (or the catalyst 41 has been refreshed).

In FIG. 4, at time t2, the catalyst 41 is refreshed.

At subsequent S150, a demand signal for leaning the air/fuel ratio (or a lean air/fuel ratio demand signal) is transmitted to the ECU 9. As a result, the microcomputer 15 outputs the lean air/fuel ratio demand signal to the communication output circuit 17, and the communication output circuit 17 transmits the lean air/fuel ratio demand signal to the ECU 9 through the digital communication line 61.

When the ECU 9 receives the lean air/fuel ratio demand signal, it reduces the ratio of the fuel in the fuel mixture to lean the air/fuel ratio.

At next S160, it is decided whether or not the first detected current value NIp1 by the NOx sensor 49 is larger than 0 [mA]. In case the answer of S160 is YES, the routine transfers to S170. In case the answer is NO, the operation of S160 is repeatedly executed for a standby till the first detected current value NIp1 becomes larger than 0 [mA].

Here, the first detected current value NIp1 varies with the oxygen concentration in the exhaust gas on the downstream side of the catalyst 41. When the first detected current value NIp1 is larger than 0 [mA], it can be decided that the combustion state (or the air/fuel ratio) of the fuel has transferred to the lean zone.

In FIG. 4, at time t3, the air/fuel ratio is controlled to the lean zone.

At subsequent S170, a lean time counter Tlean is set with 0. The operation to initialize the lean time counter Tlean is executed, and the counting operation of the same counter is started.

At next S180, it is decided whether or not the second detected current value NIp2 by the NOx sensor 49 is larger than a NOx decision value Ip2th. In case the answer of S180 is YES, the routine transfers to S190. In case the answer is NO, the operation of S180 is repeatedly executed for a standby till the second detected current value NIp2 becomes larger than the decision value Ip2th.

Here, the second detected current value NIp2 varies with the NOx concentration in the exhaust gas on the downstream side of the catalyst 41. The larger second detected current value NIp2 indicates the higher NOx concentration. Moreover, the decision value Ip2th is preset with a current value corresponding to the NOx concentration slightly lower than the concentration of the NOx, which is contained in the exhaust gas discharged from the combustion chamber at a running time of the lean air/fuel ratio.

Therefore, the second detected current value NIp2 becomes larger than the NOx decision value Ip2th, when the occluding amount of the NOx in the catalyst 41 approaches the saturated state so that the NOx occluding capacity of the catalyst 41 lowers (that is, the catalyst 41 deteriorates). In case the answer of this Step is YES, it can be decided that the NOx occluding amount of the catalyst 41 has increased up to the limit value.

In FIG. 4, at time t4, the NOx occluding amount of the catalyst 41 has increased.

At next S190, of the n-number of lean holding times Tl (n) held (or stored) in the microcomputer 15, the data stored in the second lean holding time Tl (2) are stored in the first lean holding time Tl (1). After this, in the order of third and fourth, the data stored in the n-th lean holding time Tl (n) are moved to and stored in the (n−1)-th lean holding time Tl (n−1). As a result, the data stored for the first lean holding time Tl (1) just before S190 are discarded.

After the data transfers of the second to n-th lean holding times Tl (n) were completed, the numerical value of the lean time counter Tlean at the operation starting instant of S190 is stored as the n-th lean holding time Tl(n). In other words, the counted value of the lean time counter Tlean, as started at S170, is stored as the latest lean holding time Tl (n).

At subsequent S200, the average movement value of the n lean holding times, as stored including the latest lean holding time Tl (n) acquired at S190, is calculated, and this calculation result is set as the first lean holding time average value TlA1.

At next S210, of the n lean holding times stored by the operation of S190, the latest C lean holding times are averaged, and the calculation result is set as a second lean holding time average TlA2. Here, letter C is set at a predetermined integer (e.g., 10) smaller than n.

At subsequent S220, it is decided whether or not the second lean holding time average TlA2 is smaller than the product (TlA1×K) of the first lean holding time average TlA1 and a decision coefficient K. The routine transfers to S230, in case this answer is YES, but returns to S110 in case the answer is NO.

Here, the decision coefficient K is set to a value larger than 0 and smaller than 1, such as K=0.8.

At S220, it is decided whether or not the catalyst 41 (as specified by the NOx occluding/reducing catalyst belonging to the catalyst 41) has been deteriorated by the occlusion of sulfur oxides (i.e., SOx in a chemical formula). In case this answer is NO, it is decided that no deterioration has been caused by the sulfur oxides of the catalyst 41, and the operations from S110 to S220 are repeatedly executed.

In FIG. 4, at time t11, the operations from S110 are again executed to control the air/fuel ratio to the rich zone.

In case the answer of S220 is YES, on the contrary, it is decided that the deterioration has been caused by the sulfur oxides of the catalyst 41, and the operations (to remove the sulfur oxides) from S230 to S270 are executed. Here, FIG. 4 omits the varied states of the individual portions of the case, in which the sulfur oxide removing operations are executed.

At S230, a burning demand signal for controlling the temperature of the catalyst 41 to such a high temperature as to remove the sulfur oxides is transmitted to the ECU 9. As a result, the microcomputer 15 the burning demand signal to the communication output circuit 17, and this communication output circuit 17 transmits the burning demand signal to the ECU 9 through the digital communication line 61.

When the ECU 9 receives the burning demand signal, it increases the ratio of the fuel in the fuel mixture thereby to enrich the air/fuel ratio so that the exhaust gas temperature is raised to raise the temperature of the catalyst 41.

At next S240, it is decided whether or not the catalyst downstream gas temperature Te2 is higher than the catalyst burning temperature Teth2 (e.g., 600[° C.]). In case the answer of S240 is YES, the routine transfers to S250. In case the answer is NO, the operation of S240 is repeatedly executed for a standby till the catalyst downstream gas temperature Te2 becomes higher than the catalyst burning temperature Teth2.

When the catalyst downstream gas temperature Te2 becomes higher than the catalyst burning temperature Teth2, the catalyst 41 comes into the high temperature state to dissociate the adsorbed sulfur (S).

At subsequent S250, a burning time counter Tburn is set with 0. The operation to initialize the burning time counter Tburn is executed, and the counting operation of the same counter is started.

At next S260, it is decided whether or not the burning time counter Tburn is larger than a burning time threshold value Tth. In case the answer of S260 is YES, the routine transfers to S270. In case the answer is NO, the operation of S260 is repeatedly executed for a standby till the burning time counter Tburn becomes larger than the burning time threshold value Tth. Here, this burning time threshold value Tth is set to the minimum value necessary for removing the sulfur from the catalyst 41.

At subsequent S270, a burning end signal for ending the burning operation of the catalyst 41 is transmitted to the ECU 9. As a result, the microcomputer 15 outputs the burning end signal to the communication output circuit 17, and this communication output circuit 17 transmits the burning end signal to the ECU 9 through the digital communication line 61.

When the ECU 9 receives the burning end signal, it decreases the ratio of the fuel in the fuel mixture thereby to lean the air/fuel ratio so that the exhaust gas temperature is lowered to lower the temperature of the catalyst 41.

When the operation of S270 is completed, the routine transfers to S150, at which the operations aforementioned individual Steps are again executed.

In the catalyst state detecting routine to be executed at the microcomputer 15, the operations to remove the NOx from the catalyst 41 to recover (or refresh) the catalyst 41 are executed at S110 to S140, and the operations to occlude the NOx in the catalyst 41 are executed at S150 to S190. Moreover, the operations to decide whether or not the catalyst 41 has been deteriorated with the sulfur oxides are executed at S200 to S220, and the operations to recover (or refresh) the deteriorated catalyst 41 are executed at S230 to S270.

Here in FIG. 4: times t11 and t21 correspond to the time t1; times t12 and t22 correspond to the time t2; times t13 and t23 correspond to the time t3; and time t14 corresponds to the time t4.

On the other hand, the microcomputer 15 executes, on the basis of the pressure difference between the upstream side and the downstream side of the catalyst 41, whether or not the DPF disposed in the catalyst 41 is clogged. In case the pressure difference exceeds the predetermined decision threshold value, moreover, the operation to remove the soot from the DPF is executed. Specifically, the soot having accumulated in the DPF is removed by raising the exhaust gas temperature to burn out the soot.

Here in this embodiment the communication output circuit 17 corresponds to the communication output section in the Claims, and the catalyst state detecting operation to be executed by the microcomputer 15 corresponds to the catalyst state detecting section.

As has been described hereinbefore, the sensor control device 11 of this embodiment is provided with the communication output circuit 17 for outputting the signals through the digital communication line 61, and is constructed to execute the signal transmissions and receptions with the ECU 9 through the digital communication line 61.

Moreover, the digital communication line 61 is physically a one-system cable (although two in the CAN case of this embodiment). However, a plurality of kinds of signals can be transmitted and received by the predetermined communication protocols so that numerous signals can be transmitted and received as in the case where a plurality of signal cables of the analog type are used. By using the digital communication line 61, a plurality of signal cables of the analog type having a relatively large length need not be used for transmitting/receiving a plurality of kinds of signals between the sensor control device 11 and the ECU 9.

In the internal combustion engine 1 having the plural exhaust sensors, therefore, the signal passages between the sensor control device 11 and the ECU 9 can be compiled by using the sensor control device 11. Even in the case of signal transmissions and receptions with the ECU 9 disposed at a distance position, moreover, the sensor control device 11 is enabled to suppress the reduction in the communication precision of the signals with the ECU 9 by using that digital signal line 61.

Moreover, the sensor control device 11 is constructed such that the plural drive control circuits 13, the microcomputer 15, the communication output circuits 17 and the like are housed in one casing and such that it can be connected with the plural exhaust sensors. This construction makes it unnecessary to provide each exhaust sensor with one sensor control device.

Moreover, the sensor control device 11 of this embodiment is disposed within a distance of 1 meter from the catalyst 41 so that the signal cables connecting the individual exhaust sensors around the catalyst 41 and the drive control circuits 13 of the sensor control device 11 can be set rather short. This makes it possible to reduce the influences, in which noises might otherwise be superimposed over the electric signals to flow through the signal passages from the individual exhaust sensors to the sensor control device 11. Of these, the second detected current value NIp2 to be outputted from the NOx sensor 49 has such a small value that it is easily influenced by the noises or the like. In this embodiment, however, the sizes of the signal cables to the drive control circuit 77 is short enough for suppressing the influences of the noises or the like effectively.

Moreover, the sensor control device 11 is constructed such that the microcomputer 15 executes the catalyst state detecting operations to detect the state of the catalyst on the basis of the sensor signals outputted by the drive control circuits 13 and to output the catalyst state signal indicating the detected catalyst state to the communication output circuit 17, and such that the communication output circuit 17 outputs the catalyst state signals to the ECU 9 through the digital communication line 61.

Here, the rich air/fuel ratio demand signal outputted at S120 corresponds to the catalyst state signal indicating the state (i.e., the lowered NOx occluding capacity state), in which the catalyst 41 (i.e. the NOx reducing catalyst in the catalyst 41) has occluded the NOx up to the limit value so that it cannot occlude the NOx properly any more, and the lean air/fuel ratio demand signal outputted at S150 corresponds to the catalyst state signal indicating the sate (i.e., the normal NOx occluding capacity state), in which the catalyst 41 can occlude the NOx still properly. Moreover, the burning demand signal outputted at S230 corresponds to the catalyst state signal indicating the state (i.e., the sulfur oxide deteriorated state), in which the catalyst has occluded the sulfur oxides (SOx) in much quantities so that it cannot occlude the NOx properly any more, and the burning end signal outputted at S270 corresponds to the catalyst state signal indicating the state (i.e., the normal NOx occluding capacity state), in which the catalyst 41 has dissociated the sulfur oxides so that it can occlude the NOx still properly.

Thus, the microcomputer 15 executes the catalyst state detecting operation, and the sensor control device 11 executes the operation to detect the catalyst state. As a result, the ECU 9 need not execute the catalyst state detecting operation so that the loads for the controlling operation can be lightened at the ECU 9.

Although the invention has been described in connection with its embodiment, it should not be limited to the aforementioned embodiment (as will also be called the "first embodiment") but can take a variety of modes.

For example, the drive control circuits may also be constructed not only to output the sensor signals according to the electric signals coming from the exhaust sensors but also to perform the trouble detections of the exhaust sensors thereby to output the diagnostic result signals according to the trouble detection results, to the microcomputer. Here, the trouble detections may contain the disconnection troubles of the sensors, the short-circuiting troubles of the sensors, the abnormalities of the sensor elements, the abnormalities of the heaters and so on.

The processing loads on the electronic control unit can be lightened by thus executing the various control operations such as the trouble detecting operations by the sensor control device.

On the other hand, the weak signal output sensors should not be limited to the NOx sensors having output signals at minute current values (e.g., the maximum current values of 1 [mA] or less) but also the exhaust sensors having output signals at minute voltage values (e.g.; the maximum voltage values of 100 [mV] or less)

Moreover, the communication protocols to be used in the signal transmissions/receptions through the digital communication line should not be limited to the CAN but can be other communication protocols, if these communication protocols can transmit and receive the signals between the sensor control device and the external device (e.g., ECU).

Moreover, the catalyst should not be limited to the NOx occluding/reducing catalyst but can be exemplified by a NOx selecting/reducing catalyst (SCR: Selective Catalytic Reduction).

Figure 5:
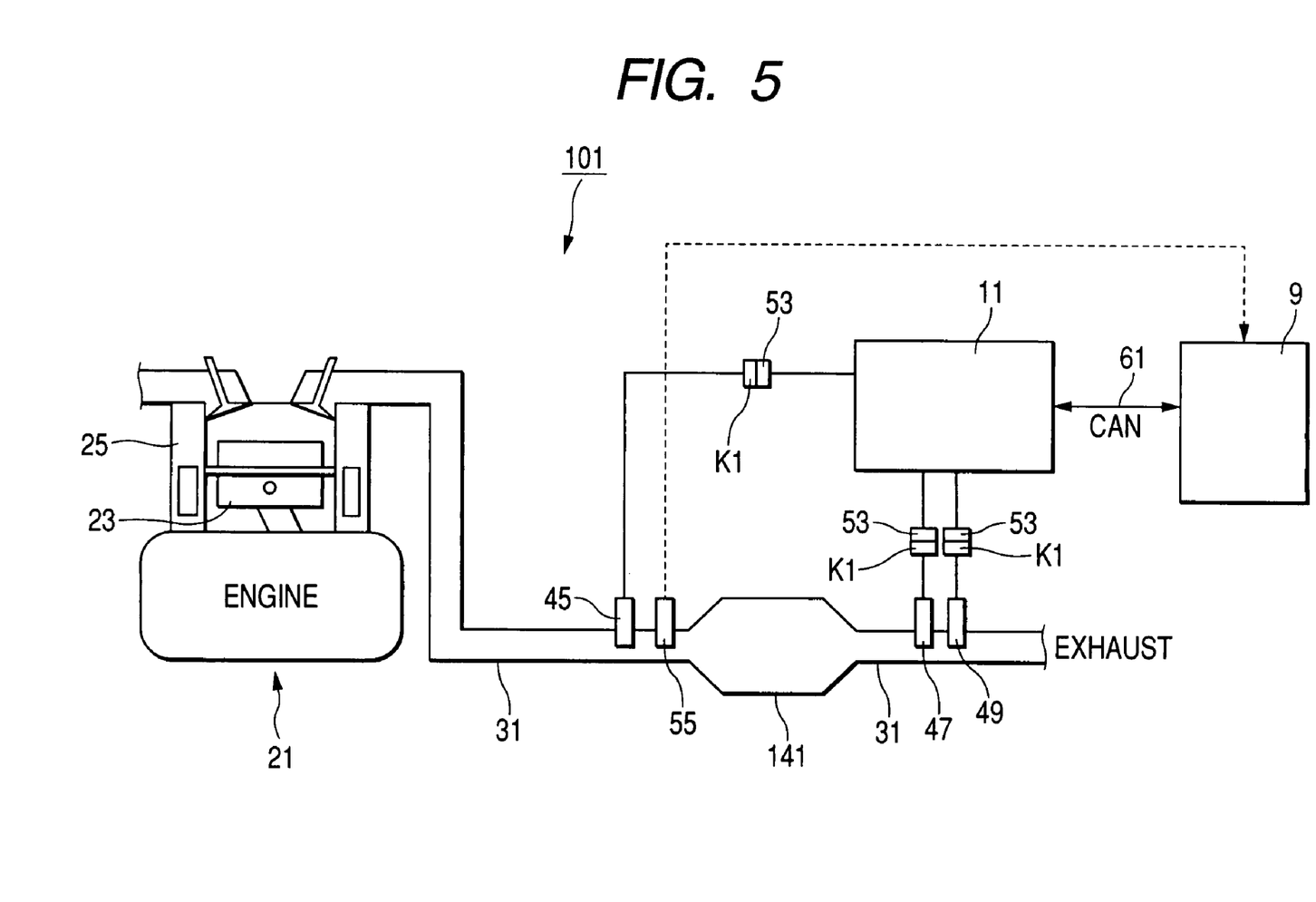
FIG. 5 is an explanatory diagram showing a schematic construction around the exhaust system of a second internal combustion engine.

Therefore, a brief description will be made on a second internal combustion engine which is provided with a second catalyst 141 made of a NOx selecting/reducing catalyst. FIG. 5 is an explanatory diagram showing a schematic construction around the exhaust system of a second internal combustion engine 101.

The second internal combustion engine 101 is constructed by eliminating the overall air/fuel ratio sensor 43 and the differential pressure sensor 51 from the internal combustion engine 1 of the first embodiment, by replacing the second catalyst 141 in place of the catalyst 41 and by disposing a urea injector 55 in the exhaust pipe 31 on the upstream of the second catalyst 141.

This second catalyst 141 has a structure using the urea as the reducing agent. This catalyst 141 converts the urea ([CO(NH$_2$)$_2$]) injected on the upstream side from the urea injector 55, into ammonia (NH$_3$) with a hydrolytic catalyst, and reduces the NOx with that ammonia into nitrogen (N$_2$) and water (H$_2$O), which are harmless to human bodies.

In the microcomputer 15 of the sensor control device 11, moreover, a second catalyst state detecting operation is executed in place of the catalyst state detecting operation described in the first embodiment. In the second catalyst state detecting operation, the control operation is executed by injecting the urea from the urea injector 55 on the basis of the output of the first temperature sensor 45.

Here, the second internal combustion engine 101 is provided with the three exhaust sensors (i.e., the first temperature sensor 45, the second temperature sensor 47 and the NOx sensor 49). Of the signal passages from the individual exhaust sensors to the ECU 9, the signal passages from the sensor control device 11 to the ECU 9 are constructed of the digital communication line 61.

The second internal combustion engine 101 thus constructed to have the sensor control device 11 for the signal transmissions/receptions through the digital communication line 61 need not use, like the internal combustion engine 1 of the first embodiment, the plural signal cables of the analog type having the relatively long sizes, so that it can suppress the reduction in the communication precision of the signals.

Moreover, the sensor control device 11 is so disposed within a range of a radius of 1 meter from the second catalyst 141 that the signal cables for connecting the individual exhaust sensors and the drive control circuits 13 of the sensor control device 11 can be set rather short. Thus, it is possible to effectively suppress the influences, under which the noises might otherwise be superimposed over the electric signals to be transmitted to the drive control circuits 13 through the signal cables.

The entire disclosure of each and every foreign patent application from which the benefit of foreign priority has been claimed in the present application is incorporated herein by reference, as if fully set forth.

What is claimed is:

1. A sensor control device for controlling at least two exhaust sensors mounted around a catalyst disposed in an exhaust passage of an internal combustion engine, the sensor control device comprising:

a plurality of drive control circuits connected in a one-to-one relation with said exhaust sensors, each of said plurality of drive control circuits being for driving/controlling each of said exhaust sensors and being for outputting sensor signals, each of said sensor signals corresponding to each of electric signals outputted by each of said exhaust sensors;

a microcomputer connected with said plurality of drive control circuits, said microcomputer being for acquiring said sensor signals; and a communication output section that outputs a plurality of signals containing at least one of said sensor signals acquired by said microcomputer, to an external device through a digital communication line, wherein said exhaust sensors comprises at least one weak signal output sensor that outputs a weak signal having one of a maximum current value of 1 [mA] or less and a maximum voltage of 100 [mA] or less, as a first electric signal which is one of said electric signals, wherein said sensor control device further comprises a casing that houses said plurality of drive control circuits, said microcomputer and said communication output section, wherein said weak signal output sensor is a NOx sensor having the maximum current value of 1 [mA] or less for said first electric signal, said first electric signal being outputted by measuring NOx concentration in exhaust gas flowing in said exhaust passage, and wherein said external device is an engine controlling device for controlling said internal combustion engine, said sensor control device is provided in such a manner that a first distance between said engine controlling device and said sensor control device is longer than a second distance between said sensor control device and said at least one weak signal output sensor, and said sensor control device further comprising a plurality of sensor connecting connectors connected in a one-to-one relationship with connectors of said exhaust sensors in a signal passage connected from said plurality of drive control circuits with said exhaust sensors, wherein each of said plurality of sensor connecting connectors can connect each of connectors of said exhaust sensors removably.

2. A sensor control device according to claim 1, wherein said microcomputer includes a catalyst state detecting section that detects a state of said catalyst on the basis of at least one of said sensor signals, each of said sensor signals being outputted by each of said drive control circuits, to output a catalyst state signal indicating the catalyst state detected, to said communication output section, and wherein said communication output section outputs said catalyst state signal to said external device through said digital communication line.

* * * * *